(12) United States Patent
Chen

(10) Patent No.: US 6,744,612 B2
(45) Date of Patent: Jun. 1, 2004

(54) INRUSH CURRENT PROTECTION CIRCUIT

(75) Inventor: Chin-Hou Chen, Taipei (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/093,796

(22) Filed: Mar. 6, 2002

(65) Prior Publication Data

US 2002/0191359 A1 Dec. 19, 2002

(30) Foreign Application Priority Data

Jun. 13, 2001 (TW) ........................................ 90114349 A

(51) Int. Cl.$^7$ ................................................. H02H 9/00
(52) U.S. Cl. ............................. 361/58; 361/18; 361/88; 361/93; 361/94; 361/111; 363/53; 363/56
(58) Field of Search ........................... 361/58, 115, 117, 361/93.9, 93, 111, 94, 110, 101, 18, 88, 89; 363/53, 56

(56) References Cited

U.S. PATENT DOCUMENTS 4,800,329 A * 1/1989 Masaki
5,930,130 A * 7/1999 Katyl et al.
5,995,392 A * 11/1999 Turner
6,335,654 B1 * 1/2002 Cole

* cited by examiner

Primary Examiner—Anthony Dinkins
Assistant Examiner—Nguyen T. Ha

(57) ABSTRACT

The invention relates to an inrush current protection circuit for a power supply. The power supply includes a rectification circuit coupled to a main body of the power supply through an energy-storage capacitor. The main body of the power supply is provided with a reference voltage, and the setup time of the reference voltage is greater than a threshold value. The inrush current protection circuit includes a current limiting resistor coupled between a negative terminal of the rectification circuit and a ground terminal of the energy-storage capacitor for preventing the generation of an inrush current the instant that the power supply is powered on, and a switch coupled in parallel with the current limiting resistor and which is controlled by the reference voltage. When the reference voltage is set up, the switch switches from an open state to a short state, so as to bypass the current limiting resistor.

12 Claims, 4 Drawing Sheets

INRUSH CURRENT PROTECTION CIRCUIT

FIELD OF THE INVENTION

The present invention is related to an inrush current protection circuit for preventing an inrush current from generation in a power supply.

DESCRIPTION OF THE PRIOR ART

As a DC-powered electric appliance such as a desktop computer or a laptop computer intends to employ an AC electric power source as its power source, a power adapter is required to perform power conversion from AC electric power into DC electric power. Referring to FIG. 1, there is shown an electric power system including a power adapter 11 for converting the AC electric power 12 into DC electric power to power an electric appliance 10. None the less, a problem is prevalent among the prior electric power systems, that is, when the electric appliance 10 is powered on or the power adapter 11 is in the initial state that the plug of the power adapter 11 (not shown) is just plugged into the outlet of the AC electric power (not shown), an excessive inrush current will be very likely generated to cause sparks on the outlet or switch. More seriously, other electric appliances in use will be interfered and the quality of the power source will be deteriorated, and further the sparks would cause unpredictable damages. For the purpose of preventing the occurrence of inrush current, a protection circuit is pioneered as shown in FIG. 2.

FIG. 2 shows a prior electric power system with an inrush current protection circuit incorporated therein. In FIG. 2, the rectification circuit 111, the energy-storage capacitor 112 and the main body 113 form a power adapter 11 as indicated in FIG. 1. The negative temperature coefficient thermistor 21 located at one side of the AC electric power is used to regulate the probable inrush current in the electric power system. The way to regulate the probable inrush current in an electric power system by the negative temperature coefficient thermistor 21 is to take advantage of the property of the negative temperature coefficient thermistor 21 that it has a high resistance under a low temperature and has a low resistance under a high temperature. When the electric appliance 10 is just powered on or the plug of the power adapter 11 is instantaneously plugged into the outlet of the AC power 12, because the negative temperature coefficient thermistor 21 has a lower temperature, a higher resistance is provided at one side of the AC electric power to suppress the inrush current in the electric power system. After a period of time that the electric power system is continuously operating, the temperature of the negative temperature coefficient thermistor 21 is lowered and its resistance is reduced, and the whole system enters into a normal operation mode. However, the electric power system of FIG. 2 is disadvantageous in terms of great power loss and can not be brought into full play in the hot swap stage.

Referring to FIG. 3, another type of prior inrush current protection circuit is shown. The inrush current protection circuit of FIG. 3 makes use of two switches 31 and 32 to regulate the probable inrush current. It can be clearly seen from FIG. 3 that the switches 31 and 32 are installed at the positive terminals of the rectification circuit 111 and the energy-storage capacitor 112, and controlled by means of the voltage signals from the high-voltage terminal 1131 of the main body 113. As a result, the specifications of the switches 31 and 32 have to match with the high voltage-resistant requirements (normally the voltage-resistant requirement is set above 600 volts). Consequently the circuit structure of FIG. 3 is deficient in terms of high circuit design complexity and high cost of the individual circuit elements. It is therefore a major object of the present invention to develop an inrush current protection circuit that can obviate the aforementioned drawbacks encountered by the prior inrush current protection circuit for a power supply.

SUMMARY OF THE INVENTION

The present invention essentially addresses an inrush current protection circuit for a power supply. According to the present invention, the power supply includes a rectification circuit and is connected to a main body of the power supply through an energy-storage capacitor. The power supply possesses a reference voltage with a setup time greater than a threshold value. The inrush current protection circuit for a power supply in accordance with a preferred embodiment of the present invention includes a current limiting resistor coupled in series between a negative terminal of the rectification circuit and a ground terminal of the energy-storage capacitor for preventing an inrush current from generation at an instant that the power supply is powered on, and a switch coupled in parallel with the current limiting resistor which switches from open state to short state after the reference voltage is set up, whereby bypass the current limiting resistor.

Another respect of the present invention comprehends an inrush current protection circuit for an electric appliance. The electric appliance includes a rectification circuit and is connected to a main body of the electric appliance through an energy-storage capacitor. The electric appliance is provided with a reference voltage with a setup time greater than a threshold value. The inrush current protection circuit includes a current limiting resistor coupled in series between a negative terminal of the rectification circuit and a ground terminal of the energy-storage capacitor for preventing an inrush current from generation at an instant that the electric appliance is powered on, and a switch coupled in parallel with the current limiting resistor which switches from open state to short state after the reference voltage is set up, whereby bypass the current limiting resistor.

The inrush current protection circuit in accordance with a preferred embodiment of the present invention further includes a capacitor coupled in series between a reference voltage input terminal of the switch and a negative terminal of the rectification circuit for increasing the setup time of the reference voltage, a resistor coupled in series between the reference voltage input terminal of the switch and the reference voltage for regulating a charging current of the capacitor as below a predetermined current level, and a PNP-type bipolar junction transistor with a base coupled to the reference voltage, an emitter coupled to the reference voltage input terminal of the switch and a collector coupled to a negative terminal of the rectification circuit for accelerating the charging operation of the capacitor as the reference voltage is dropped to a predetermined voltage level.

Further, the inrush current protection circuit of the present invention includes a zener diode coupled in series between a reference voltage input terminal of the switch and a negative terminal of the rectification circuit for limiting the voltage across the switch.

In a preferable aspect of the present invention, the switch is formed from a metal-oxide-semiconductor field-effect transistor (MOSFET), and the threshold value is exactly the chargeup time of the energy-storage capacitor.

Now the foregoing and other features and advantages of the present invention will be more clearly understood through the following descriptions with reference to the accompanying drawings, in which:

DETAILED DESCRIPTION OF THE PREFERRED EMBODIMENT

Figure 1:
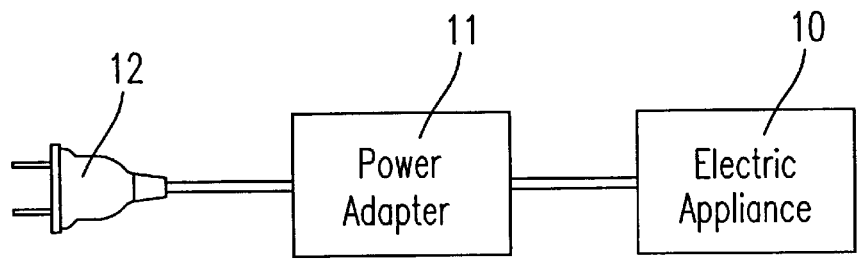
FIG. 1 schematically depicts a prior electric power system.
Figure 2:
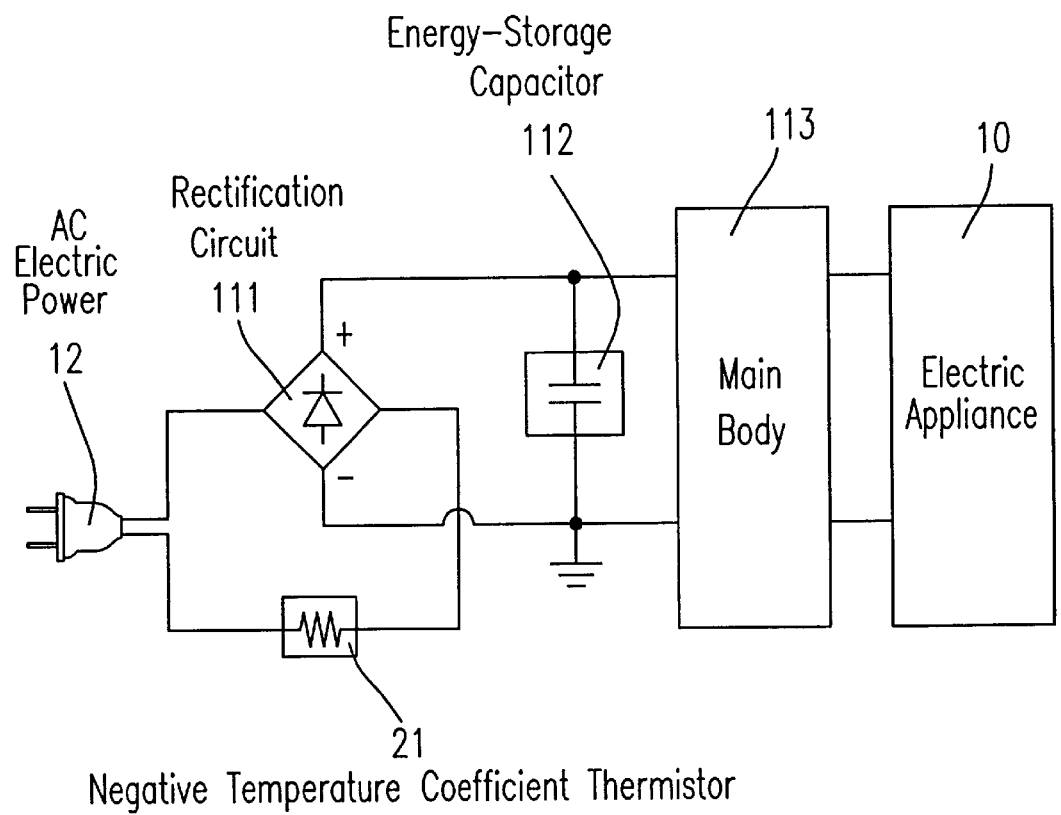
FIG. 2 schematically shows a prior electric power system with an inrush current protection circuit incorporated therein.
Figure 3:
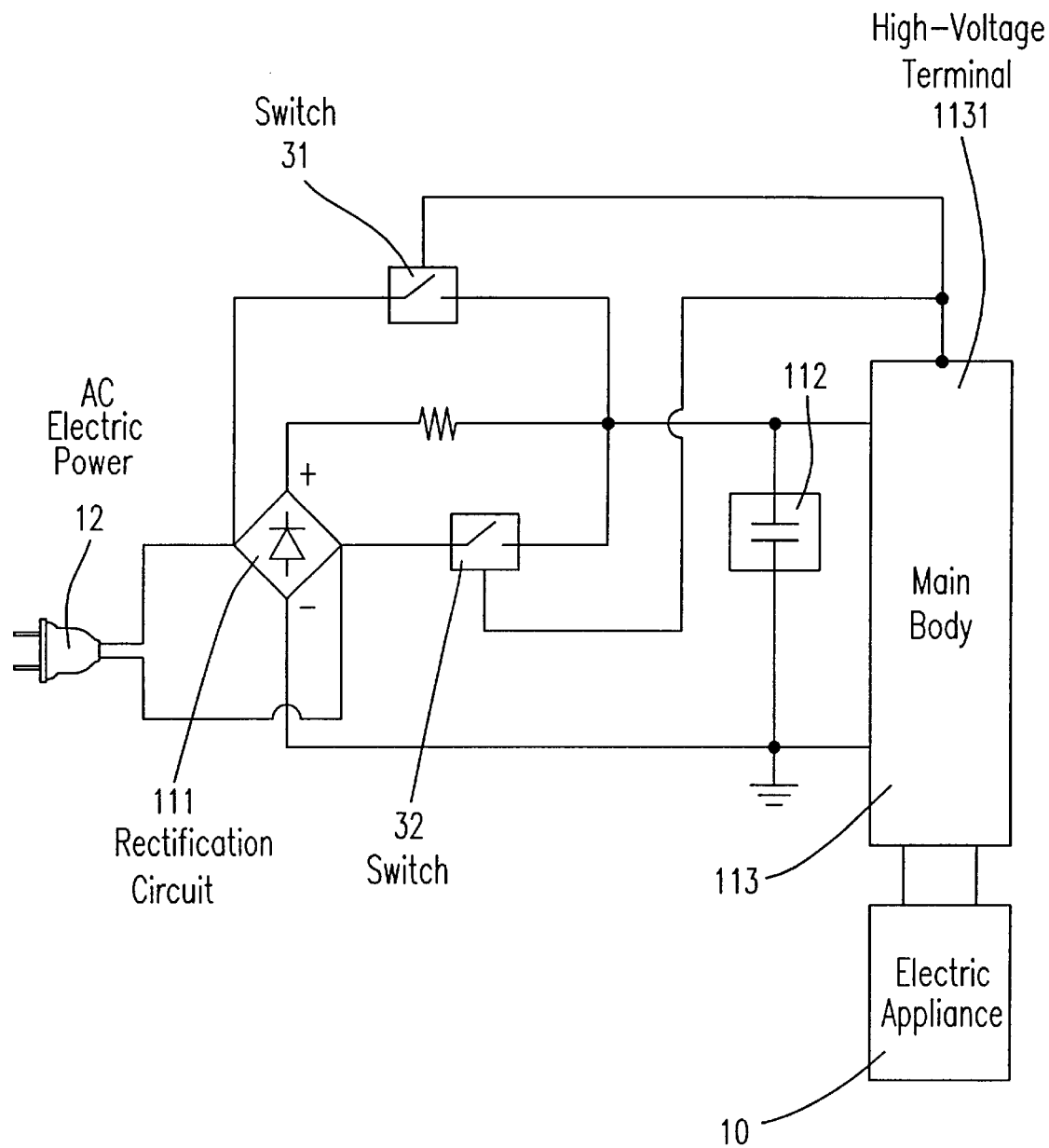
FIG. 3 schematically shows a prior electric power system with another type of inrush current protection circuit incorporated therein.
Figure 4:
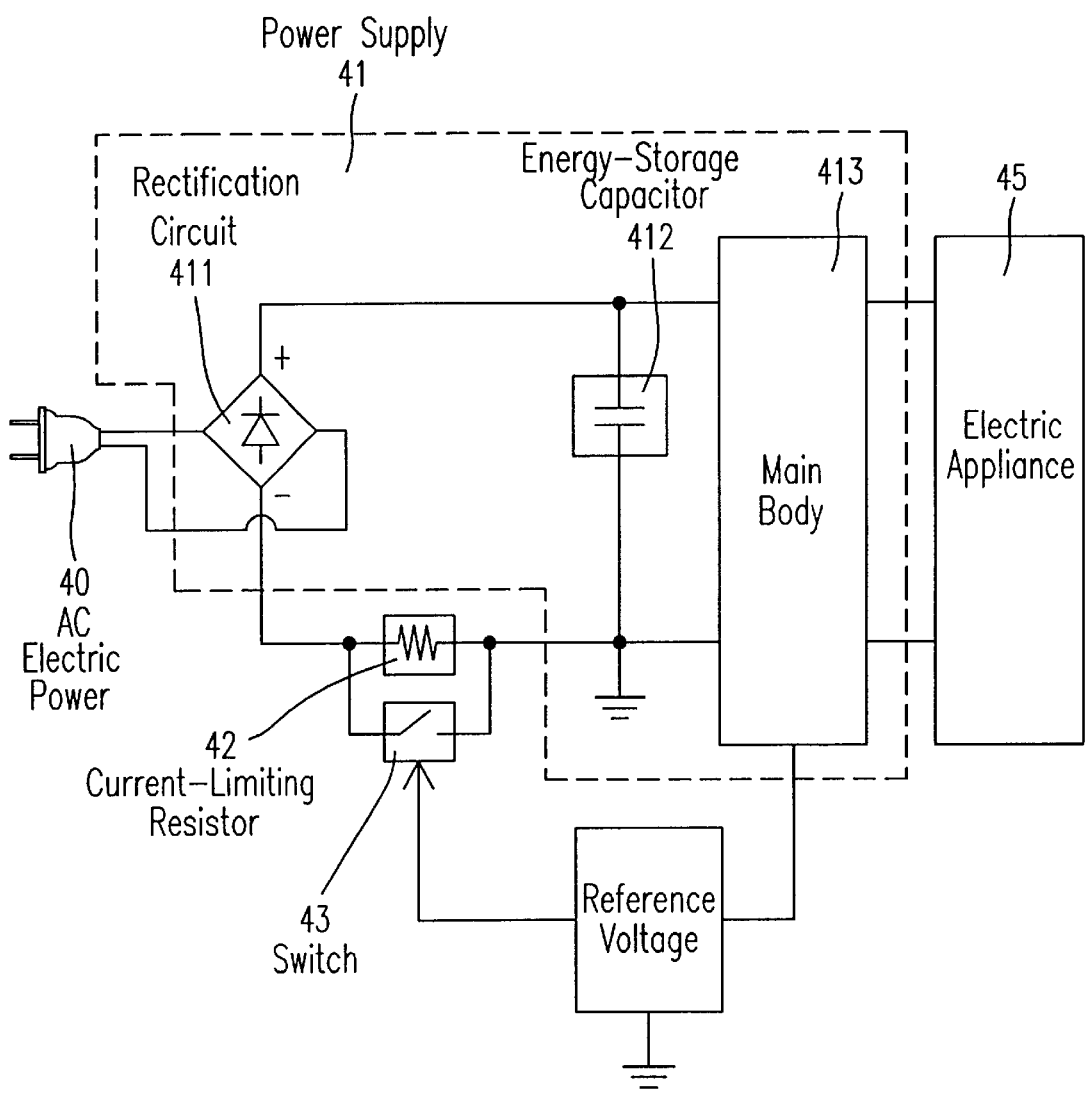
FIG. 4 shows a functional circuit diagram of the inrush current protection circuit of the present invention for use in an electric power system.

Turning to FIG. 4, a preferred embodiment of the inrush current protection circuit to be applied in an electric power system including a power supply 41 (for example, an AC/DC converter) and an electric appliance 45 according to the present invention is illustrated. The power supply 41 includes a rectification circuit 411, an energy-storage capacitor 412 and a main body 413. The main body 413 is provided with a reference voltage with a setup time greater than a threshold value. The threshold value is set as the chargeup time of the energy-storage capacitor 412. Taking a common switching mode power supply as an example, the reference voltage of the power supply can be supplied by the 5-V reference voltage pin of the IC embedded therein. In FIG. 4, the inrush current protection circuit of the present invention generally includes a current limiting resistor 42 and a switch 43. The current limiting resistor 42 is coupled in series between a negative terminal of the rectification circuit 411 and a ground terminal of the switch 43 for regulating the magnitude of the inrush current generated at an instant that the AC electric power is contacted with the power supply 41. The switch 43 is coupled in parallel with the current limiting resistor 42 and is controlled under the reference voltage so as to switch from open state to short state after the reference voltage is set up. In this manner, at an instant that the power supply 41 is powered on, the reference voltage is not set up yet and the switch 43 is open. The current limiting resistor 42 is able to limit the current flowing into the energy-storage capacitor 412 and the main body 413 so as to prevent the inrush current from generation. Once the reference voltage is set up, the switch switches from open state to short state to disable the current limiting resistor 42, and the power supply 41 enters into a normal operation mode.

Figure 5:
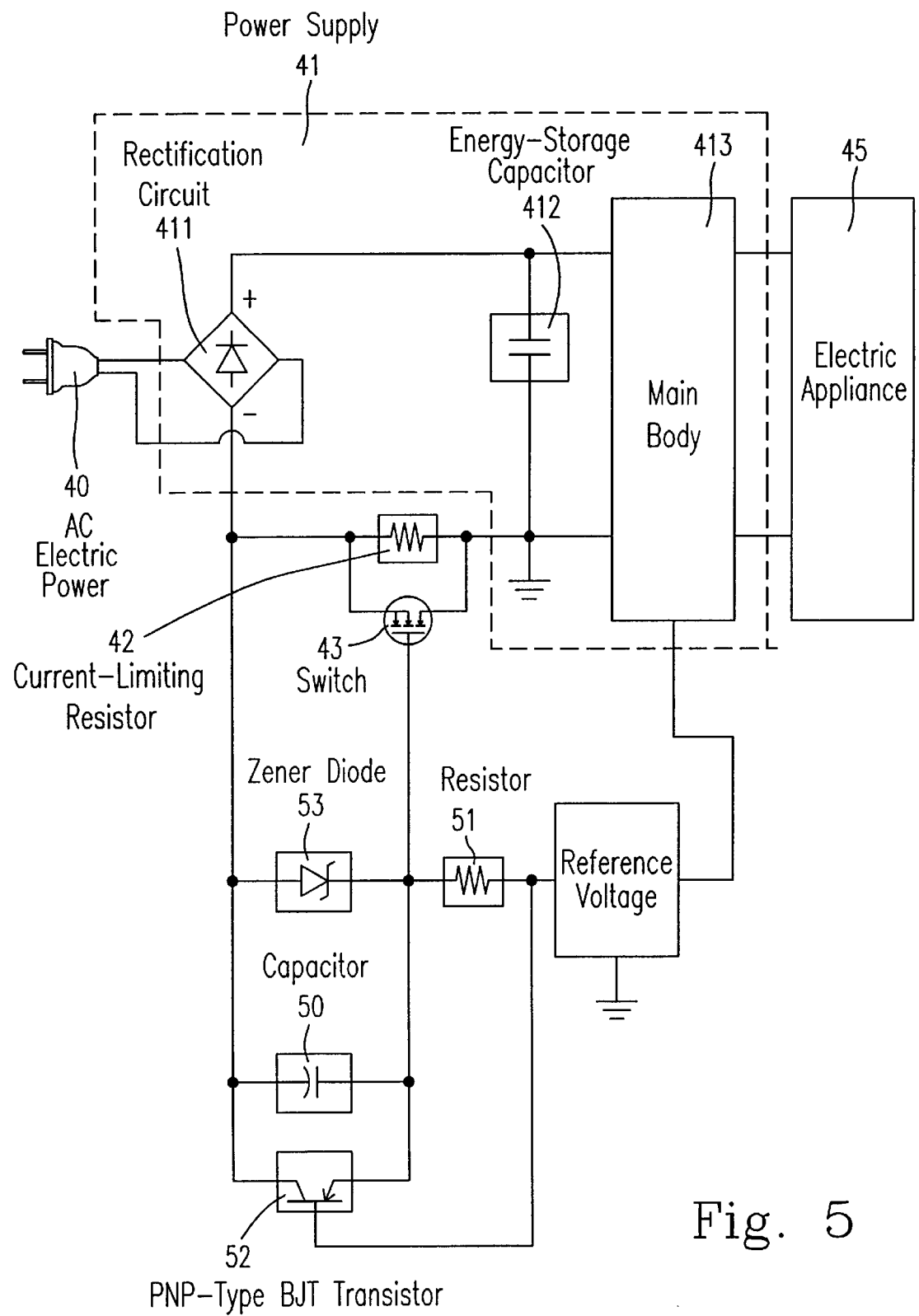
FIG. 5 shows a functional circuit block diagram of the electric power system incorporating the inrush current protection circuit of the present invention.

Referring to FIG. 5, the switch 43 is formed from a metal-oxide-semiconductor field-effect transistor (MOSFET). In this preferred embodiment, a capacitor 50, a resistor 51, a PNP-type bipolar junction transistor (BJT) 52 and a zener diode 53 are further provided for enhancing the performance of the inrush current protection circuit. The capacitor 50 is coupled in series between a reference voltage input terminal of the switch 43 and a negative terminal of the rectification circuit 411 for increasing the setup time of the reference voltage. The resistor 51 is coupled in series between the reference voltage input terminal of the switch 43 and the reference voltage for regulating the charging current of the capacitor 50 as below a predetermined current level. The PNP-type bipolar junction transistor 52 includes a base terminal coupled to the reference voltage, an emitter coupled to the reference voltage input terminal of the switch 43 and a collector coupled to a negative terminal of the rectification circuit 411. The PNP-type bipolar junction transistor 52 is used to accelerate the charging operation of the capacitor 50 as the reference voltage is dropped to a predetermined voltage level (for example, when the main body 41 is shut down). Even the power supply 41 rapidly switches from on-state to off-state and then switches from off-state to on-state, the inrush current protection circuit of the present invention can effective regulate the inrush current to a reasonable level. The Zener diode 53 is coupled in series between a reference voltage input terminal of the switch 43 and a negative terminal of the rectification circuit 411, which plays a roll as a protection circuit for the switch 43 for limiting the voltage across the switch 43.

In conclusion with the above statements, the inrush current protection technique of the present invention can effectively prevent the excessive inrush current from generation, and the power supply can be brought into full play when it is in the hot swap stage. More advantageously, the power loss of the MOSFET-implemented switch is quite small, and therefore the great power loss disadvantages experienced by the prior electric power system can be much improved. Besides, the circuit structure of the electric power system of the present invention installs a switch 43 between a negative terminal of the rectification circuit 411 and a ground terminal of the energy-storage capacitor 412, such that the voltage-resistant requirements of the switch 43 do not need to be set as high as that of the switch in a prior electric power system. The cost of the individual circuit elements can thus be effectively reduced and is not susceptible to damage.

Naturally, the kernel of the present invention is applicable to any appliances that requires performing AC/DC power conversion, for example, a laptop computer in which the power supply 41 is separate from the electric appliance 45, or a desktop computer in which the power supply 41 is combined into the electric appliance 45 so that it is provided with the function of AC/DC power conversion. In a further respect of the present invention, the kernel of the present invention can be applied to the appliances that requires performing DC/DC, AC/AC power conversions, and still can effectively prevent the occurrence of inrush current at an instant that the DC or AC electric power is contacted with the power supply 41.

While the present invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An inrush current protection circuit for a power supply including a rectification circuit coupled to a main body of said power supply through an energy-storage capacitor, said main body is provided with a reference voltage with a setup time greater than a threshold value, said inrush current protection circuit comprising:

a current limiting resistor coupled in series between a negative terminal of said rectification circuit and a ground terminal of said energy-storage capacitor connected to a ground for preventing an inrush current from generation at an instant that the power supply is powered on;

a switch coupled in parallel with said current limiting resistor and is-controlled under said reference voltage so as to switch from an open state to a short state after said reference voltage is set up, thereby to bypass said current limiting resistor; and a zener diode coupled in series between a reference voltage input terminal of said switch and a negative terminal of said rectification circuit for limiting a voltage across said switch.

2. The inrush current protection circuit of claim 1 further comprising a capacitor coupled in series between a reference voltage input terminal of said switch and a negative terminal of said rectification circuit for increasing said setup time of said reference voltage.

3. The inrush current protection circuit of claim 2 further comprising a resistor coupled in series between a reference voltage input terminal of said switch and said reference voltage for regulating a charging current of said capacitor as below a predetermined current level.

4. The inrush current protection circuit of claim 2 further comprising a PNP-type bipolar junction transistor with a base coupled to said reference voltage, an emitter coupled to a reference voltage input terminal of said switch and a collector coupled to a negative terminal of said rectification circuit for accelerating a charging operation of said capacitor when said reference voltage is dropped to a predetermined voltage level.

5. The inrush current protection circuit of claim 1 wherein said switch is formed from a metal-oxide-semiconductor field-effect transistor.

6. The inrush current protection circuit of claim 1 wherein said threshold value is set as a chargeup time of said energy-storage capacitor.

7. An inrush current protection circuit for an electric appliance including a rectification circuit coupled to a main body of said electric appliance through an energy-storage capacitor, said main body is provided with a reference voltage with a setup time greater than a threshold value, said inrush current protection circuit comprising:

a current limiting resistor coupled in series between a negative terminal of said rectification circuit and a ground terminal of the energy-storage capacitor connected to a around for preventing an inrush current from generation at an instant that said electric appliance is powered on;

a switch coupled in parallel with said current limiting resistor and is-controlled under said reference voltage so as to switch from an open state to a short state after the said reference voltage is set up, thereby to bypass said current limiting resistor; and a zener diode coupled in series between a reference voltage input terminal of said switch and a negative terminal of said rectification circuit for limiting a voltage across said switch.

8. The inrush current protection circuit of claim 7 further comprising a capacitor coupled in series between a reference voltage input terminal of said switch and a negative terminal of said rectification circuit for increasing said setup time of said reference voltage.

9. The inrush current protection circuit of claim 8 further comprising a resistor coupled in series between an reference voltage input terminal of said switch and said reference voltage for regulating a charging current of said capacitor as below a predetermined voltage level.

10. The inrush current protection circuit of claim 8 further comprising a PNP-type bipolar junction transistor with a base coupled to said reference voltage, an emitter coupled to a reference voltage input terminal of said switch and a collector coupled to a negative terminal of said rectification circuit for accelerating a charging operation of said capacitor when said reference voltage is dropped to a predetermined voltage level.

11. The inrush current protection circuit of claim 7 wherein said switch is formed from a metal-oxide-semiconductor field-effect transistor.

12. The inrush current protection circuit of claim 7 wherein said threshold value is set as a chargeup time of said energy-storage capacitor.

* * * * *